(No Model.)  W. H. BLESSLEY.
DRIVE PULLEY.
No. 403,086.  Patented May 14, 1889.
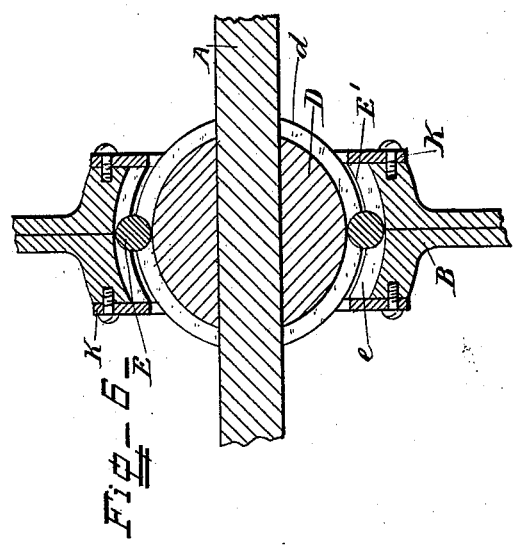
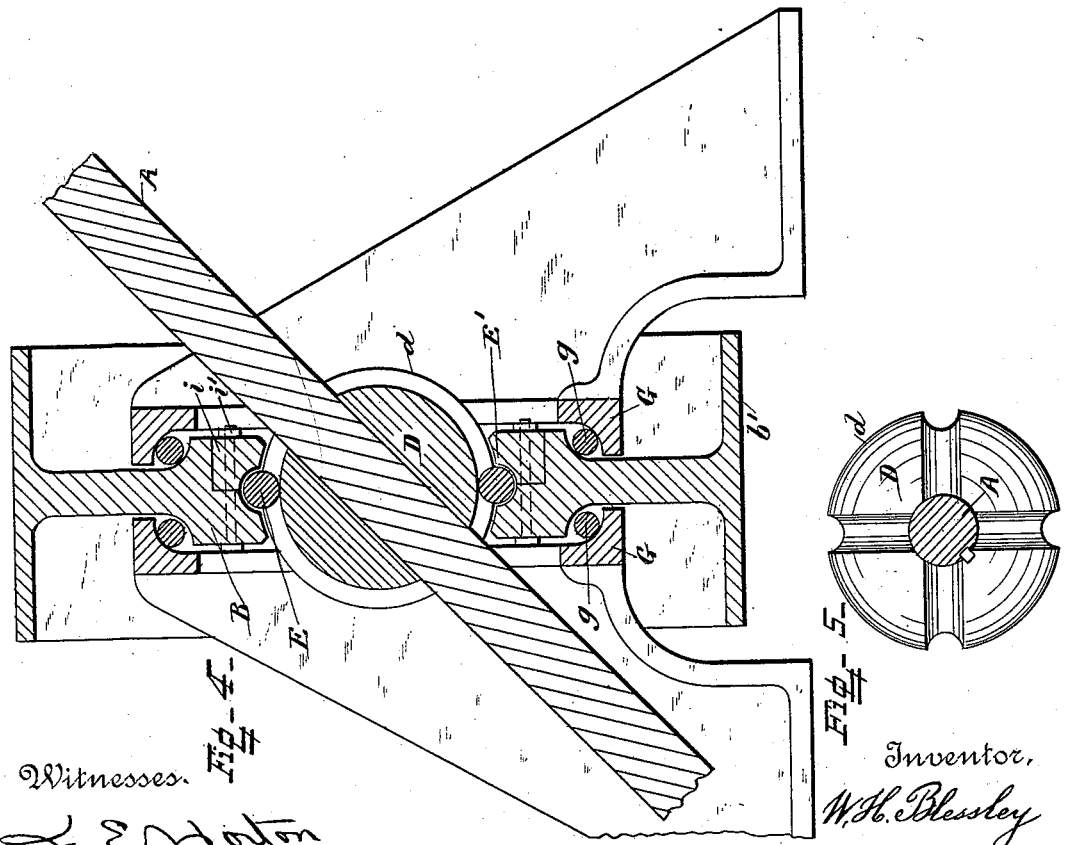
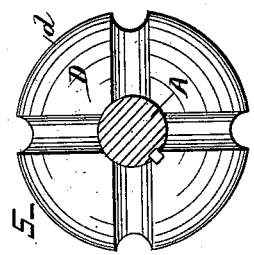

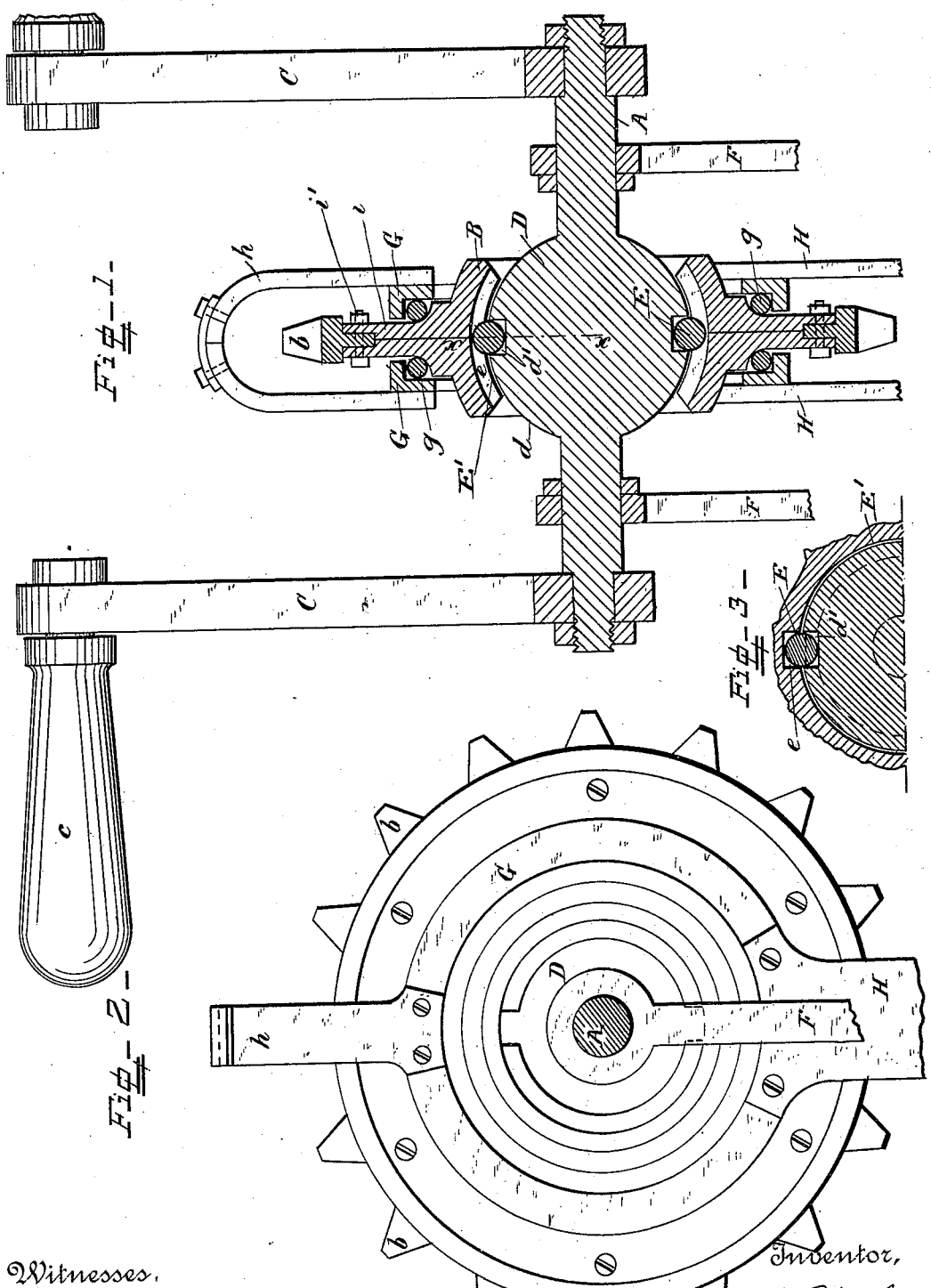

UNITED STATES PATENT OFFICE.

WILLIAM HENRY BLESSLEY, OF HARROGATE, COUNTY OF YORK, ENGLAND.

DRIVE-PULLEY.

SPECIFICATION forming part of Letters Patent No. 403,086, dated May 14, 1889.

Application filed December 20, 1888. Serial No. 294,213. (No model.)

*To all whom it may concern:*

Be it known that I, WILLIAM HENRY BLESSLEY, a citizen of Great Britain, residing at Harrogate, in the county of York, England, have invented certain new and useful Improvements in Drive-Pulleys; and I do hereby declare the following to be a full, clear, and exact description of the invention, such as will enable others skilled in the art to which it appertains to make and use the same.

This invention relates to drive-pulleys for communicating motion or power; and it consists in the novel construction and combination of the parts, as hereinafter fully described and claimed, whereby the angle of the plane of rotation of the pulley may be varied with reference to the axis of its shaft or axle.

In the drawings, Figure 1 is a longitudinal section through a drive-chain pulley and its axle, showing means for supporting the pulley and rotating the axle. Fig. 2 is an end view of the same; and Fig. 3 is a cross-section on line $x\ x$ in Fig. 1. Fig. 4 is a longitudinal section through a drive-belt pulley and its axle, showing means for supporting and guiding the pulley. Fig. 5 is an end view of the axle shown in Fig. 4, removed from the pulley. Fig. 6 shows a form of connection in which both hub and axle are provided with spherical cross-grooves and movable projections common to both grooves.

A is the axle, and B is the hub of the pulley secured thereupon, so as to revolve with it. The periphery of the pulley may be provided with teeth $b$, adapted to engage with a drive-chain, as shown in Fig. 1, or it may be a plain surface, $b'$, adapted for a belt, as shown in Fig. 4, or the periphery may be of any other form adapted for the transmission of power to or from the axle.

In order that the angle of the plane of rotation of the pulley with the axis of the axle may be varied, the pulley-hub is not fastened rigidly to the axle, but one or more lateral grooves are provided in a spherical surface formed upon either the hub, or a boss on the axle, or on both of them. This spherical surface has for its center the common center of the axle and pulley and permits the plane of the rotation of the pulley to be varied. The pulley is caused to revolve with the axle by means of one or more balls which are free to slide laterally in the said groove or grooves, but which are not free to slide in the direction of the rotation of the axle and pulley.

Figs. 1 and 2 show the invention applied to a chain-pulley for driving a velocipede.

C are crank-arms secured to the axle of the pulley, and $c$ are handles; but foot-pedals may also be used in place of handles, and the crank-arms may then be arranged upon opposite sides of the said axle.

D is a boss on the axle, which is provided with a spherical surface, $d$. This boss may be formed integral with the axle, or it may be made separate and firmly secured to it. Pockets or receptacles $d'$ are formed in the spherical surface $d$, and E are balls which fit in the said pockets and which form hemispherical projections above the said spherical surface. The receptacles are made square and flat-bottomed, so that the ball only touches them at five points, and can roll in every direction with the least possible friction. The hub B of the pulley is also provided with a spherical surface, E', and $e$ are lateral grooves in the said surface with which the projecting halves of the balls E engage, and thereby cause the pulley to rotate with the axle.

F are the ends of the rods which connect the axle with the steering apparatus of the velocipede. The pulley is supported by the circular guides G, which are provided with ball-bearings $g$.

H are the supports for the guides, and $h$ is a stay for steadying the upper parts of the guides.

The pulley-hub B is provided with a loose portion, $i$, secured to it by bolts $i'$, so that the device may be put together. This loose portion may be an entire one-half of the pulley or only a portion of it, as may be found expedient.

It will be seen in Fig. 1 that the plane of rotation of the pulley may be varied while the axis of rotation remains constant. The converse of this is shown in Fig. 4, in which the plane of rotation of the pulley is kept constant by the circular guides being secured to stationary brackets.

The remaining figures show different methods of construction.

Fig. 5 shows four ball-grooves on the axle-boss.

In Fig. 6 both hub and axle-boss are provided with spherical surfaces and lateral grooves, and the balls or movable projections E engage with both the grooves, and are kept from falling out by the plates K, secured to the hub of the pulley.

What I claim is—

1. The combination of a drive-pulley, circular guides or bearings encircling and supporting the outside of the pulley-hub, an axle provided with a spherical boss inside said pulley-hub, and permitting the plane of rotation of the pulley and the axis of rotation of the axle to be varied with reference to each other, and one or more balls interposed between the said boss and hub and engaging with both in the direction of rotation, thereby causing the said pulley and axle to revolve simultaneously.

2. The combination, with a drive-pulley having a spherical cavity in its hub, of an axle provided with a spherical boss fitting within said cavity, one of the said elements being provided with one or more curved lateral grooves, and the other element being provided with one or more square flat-bottomed receptacles, and a ball fitting into each receptacle and engaging with one of the said grooves, thereby causing the simultaneous revolution of the axle and pulley and permitting the plane of rotation of the pulley and the axis of rotation of the axle to be varied with reference to each other.

3. The combination, with a drive-pulley having a spherical cavity, and one or more curved lateral grooves in its hub, of an axle provided with a spherical boss having one or more square flat-bottomed receptacles in it, and a ball fitting into each receptacle and engaging with the corresponding groove in the hub, substantially as and for the purpose set forth.

4. The combination, with a drive-pulley having a spherical cavity in its hub, and an axle provided with a spherical boss fitting within the said cavity, of one or more balls interposed between said boss and hub and engaging with both in the direction of rotation, thereby causing the axle and pulley to revolve together, and a ball-bearing for the said pulley to revolve in, substantially as and for the purpose set forth.

In testimony whereof I affix my signature in presence of two witnesses.

WILLIAM HENRY BLESSLEY.

Witnesses:
I. I. DALES,
FRED WATSON.